(12) United States Patent
Xu

(10) Patent No.: US 7,279,646 B2
(45) Date of Patent: Oct. 9, 2007

(54) DIGITAL SIGNATURE COLLECTION AND AUTHENTICATION

(75) Inventor: Jianping Xu, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1166 days.

(21) Appl. No.: 09/865,952

(22) Filed: May 25, 2001

(65) Prior Publication Data

US 2002/0176577 A1 Nov. 28, 2002

(51) Int. Cl.
*G09G 5/00* (2006.01)
*G06K 11/06* (2006.01)

(52) U.S. Cl. ............... 178/18.01; 345/179; 178/19.04

(58) Field of Classification Search ............... 380/258; 178/18.03, 18.04, 18.01, 19.04; 345/156–160, 345/162, 173–177, 179
See application file for complete search history.

(56) References Cited

U.S. PATENT DOCUMENTS

| | | | |
|---|---|---|---|
| 4,012,588 A | 3/1977 | Davis et al. .................. 178/18 |
| 4,506,354 A | 3/1985 | Hansen ........................ 367/101 |
| 4,507,557 A | 3/1985 | Tsikos ......................... 250/341 |
| 4,758,691 A | 7/1988 | De Bruyne .................. 178/19 |
| 4,814,552 A | 3/1989 | Stefik et al. ................. 178/18 |
| 4,862,152 A | 8/1989 | Milner ........................ 340/712 |
| 5,142,506 A | 8/1992 | Edwards ..................... 367/127 |
| 5,308,936 A | 5/1994 | Biggs et al. ................. 178/18 |
| 5,317,140 A | 5/1994 | Dunthorn .................... 250/221 |
| 5,517,579 A | 5/1996 | Baron et al. ................ 382/187 |
| 5,526,023 A | 6/1996 | Sugimoto et al. ........... 345/173 |
| 5,570,299 A | 10/1996 | Tokioka et al. .............. 364/560 |
| 5,673,386 A | 9/1997 | Batra ........................... 395/183.14 |
| 5,686,705 A | 11/1997 | Conroy et al. .............. 178/18.05 |
| 5,717,168 A * | 2/1998 | DeBuisser et al. ......... 178/18.04 |
| 5,740,357 A | 4/1998 | Gardiner et al. ........... 395/185.1 |
| 5,781,451 A | 7/1998 | Lofthus et al. ............. 364/571.01 |
| 5,945,981 A | 8/1999 | Paull et al. .................. 345/180 |
| 5,977,958 A | 11/1999 | Baron et al. ................ 345/179 |
| 6,008,798 A | 12/1999 | Mato, Jr. et al. ........... 345/168 |

(Continued)

FOREIGN PATENT DOCUMENTS

EP 0312481 4/1989

(Continued)

OTHER PUBLICATIONS http://sketch.inesc-id.pt/technicalreports/D05.pdf, pp. 1-5, 40-57.*

(Continued)

*Primary Examiner*—David Jung
(74) *Attorney, Agent, or Firm*—Michael R. Barre

(57) ABSTRACT

A digital signature collection and authentication system includes an ink pen having an ultrasonic transmitter that transmits ultrasonic energy to a plurality of ultrasonic receivers. A computer triangulates the location of the pen versus time to generate the signature shape, and to generate velocity and acceleration data. The pen also includes a pressure sensitive tip to record pressure applied to the pen tip. The pen also includes a higher frequency burst transmitter useful to generate a time reference, and to transmit the pressure information. The computer packetizes the shape, velocity, acceleration, and pressure data with a time stamp and an IP address or phone number, encrypts the packet and sends it to a host computer for authentication.

16 Claims, 4 Drawing Sheets

U.S. PATENT DOCUMENTS

| | | | |
|---|---|---|---|
| 6,100,538 A | 8/2000 | Ogawa | 250/559.29 |
| 6,184,873 B1 * | 2/2001 | Ward et al. | 345/177 |
| 6,208,330 B1 | 3/2001 | Hasegawa et al. | 345/173 |
| 6,288,711 B1 | 9/2001 | Tanaka et al. | 345/179 |
| 6,424,340 B1 * | 7/2002 | Holtzman et al. | 345/173 |
| 6,504,530 B1 | 1/2003 | Wilson et al. | 345/173 |
| 6,724,371 B1 * | 4/2004 | Shenholtz et al. | 345/177 |
| 6,731,270 B2 * | 5/2004 | Tosaya | 345/173 |
| 6,747,599 B2 * | 6/2004 | McEwan | 342/463 |
| 2001/0000666 A1 | 5/2001 | Wood et al. | 345/179 |
| 2002/0134594 A1 | 9/2002 | Taylor et al. | 178/18.01 |

FOREIGN PATENT DOCUMENTS

| | | |
|---|---|---|
| EP | 0730230 | 9/1996 |
| EP | 0753723 | 1/1997 |
| EP | 0953911 | 11/1999 |
| EP | 1128320 | 8/2001 |
| FR | 2664423 | 1/1992 |
| FR | 2698191 | 5/1994 |
| JP | 11203043 | 7/1999 |
| WO | WO-0753723 | 1/1997 |
| WO | WO 99/36883 | 7/1999 |
| WO | WO-00/23939 | 4/2000 |
| WO | WO-00/28348 | 5/2000 |
| WO | WO-00/73976 | 12/2000 |
| WO | WO 01/35329 | 5/2001 |

OTHER PUBLICATIONS http://www.ischool.berkeley.edu/~ping/peep/yee-peep-chi2003-paper.pdf.*
http://privatewww.essex.ac.uk/~fleum/VIEv2.pdf.*
German Application No.: 17409/KK, German Office action, (Jul. 12, 2006), 1-5.
"Getting Started With Your Mimo", *Virtual Ink, Owners Manual,* (1999).
"Mimio Installation", *Virtual Ink,* www.mimio.com/support, 4 pgs.
Brenner, A., et al., "A Sonic Pen: A Digital Stylus System", *IEEE Transactions On Computers, C-19,* 546-548, (Jun. 1970).

* cited by examiner

DIGITAL SIGNATURE COLLECTION AND AUTHENTICATION

FIELD

The present invention relates generally to data authentication, and more specifically to systems for digital signature collection and authentication.

BACKGROUND

Digital signature authentication is becoming more important as more people conduct business electronically. For example, when electronically banking, electronically filing taxes, and when entering contracts over the internet, a digital signature may be collected and authenticated.

Researchers and vendors have been working to find ways to authenticate digital signatures, and to verify that those signatures have been validly collected. Signatures can be collected using pen tablets such as those commercially available from Interlink Electronics of Camarillo, Calif., and Wacom Colo. Ltd., of Vancouver Wash. These pen tablets, and other similar devices, collect a signature shape for recording by using a pressure sensitive tablet. Some pens are tethered, and some are not. Typically, the tablet is connected to a port on a computer, and the shape of the signature is sent from the tablet to the computer through the port.

Authentication is typically limited to the data that is collected at the time of the signature. For example, signature shapes collected using pen tablets are typically compared against known shapes to determine authenticity. The above techniques and products notwithstanding, digital signatures are still fairly easily forged, in part because the shape of the signature is often the only criteria collected, and therefore the only criteria used for authentication.

For the reasons stated above, and for other reasons stated below which will become apparent to those skilled in the art upon reading and understanding the present specification, there is a need in the art for an alternate methods and apparatus for digital signature collection and authentication.

DESCRIPTION OF EMBODIMENTS

Figure 1:
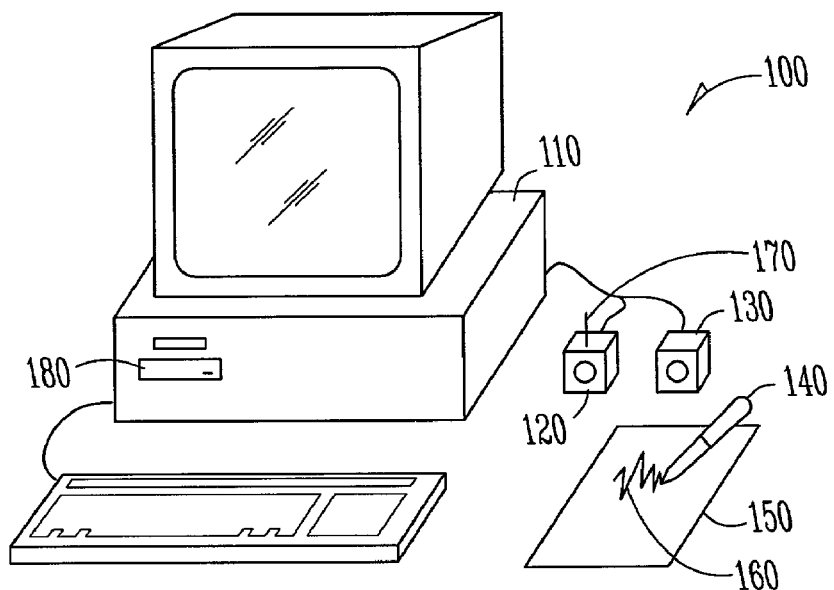
FIG. 1 shows a signature collection and authentication system.

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism to collect and authenticate digital signatures. A pen with an ultrasonic transmitter transmits ultrasonic pulses to a plurality of receivers. The receivers provide time-of-arrival information to a computer that triangulates the position of the ultrasonic pen versus time. The location information is stored as the signature shape. Velocity and acceleration of the ultrasonic pen are calculated and bundled with the signature shape as part of the collected signature to be authenticated. The pen has a pressure sensitive tip to collect data representing pressure applied to the tip of the pen. The pen also includes a higher frequency burst transmitter that provides a time reference, and also transmits the pressure information. The pressure information is also bundled with the signature shape as part of the collected signature to be authenticated. In some embodiments, further data is bundled as part of the collected signature to be authenticated. For example, a time stamp and an address of the computer can be bundled. The computer then makes a comparison between the collected signature and a known signature, or the computer can send the collected signature to a different computer for the comparison.

FIG. 1 shows a signature collection and authentication system. System 100 includes computer 110 with storage medium 180, receivers 120 and 130, and ultrasonic pen 140. Ultrasonic pen 140, as is explained in more detail below, includes an ultrasonic transmitter used to triangulate the position of the pen. In some embodiments, ultrasonic pen 140 also includes an ink cartridge capable of writing on a surface such as paper. As show in FIG. 1, signature shape 160 is written in ink on paper 150.

Ultrasonic pen 140 emits ultrasonic energy in pulses. In some embodiments, pulses are emitted at a rate of between 50 and 100 pulses per second. In some embodiments, ultrasonic pen 140 includes a higher frequency transmitter in addition to an ultrasonic transmitter. For the purposes of this description, a "higher frequency" is any frequency higher than that used for ultrasonic communication. Examples of higher frequencies include frequencies in the infrared (IR) spectrum, and radio frequency (RF) spectrum. In embodiments that include a higher frequency transmitter in ultrasonic pen 140, a corresponding higher frequency receiver is included in system 100. In the embodiments represented by FIG. 1, receiver 120 includes antenna 170 to receive higher frequency bursts from ultrasonic pen 140. The higher frequency transmitter is also a burst transmitter that can be used as a time reference for receivers 120 and 130. Because the velocity of the higher frequency signals is much greater than the velocity of the ultrasonic energy, the higher frequency bursts are used as a time reference.

Receivers 120 and 130 are ultrasonic receivers that receive ultrasonic bursts from ultrasonic pen 140, and provide time-of-arrival information to computer 110. Receivers 120 and 130 are located on a surface (not shown) preferably in the same plane as paper 150, and in some embodiments, receivers 120 and 130 are rigidly affixed to the surface. Computer 110 receives the time-of-arrival information from receivers 120 and 130, calculates the distance of ultrasonic pen 140 from each receiver, and triangulates the position of ultrasonic pen 140 versus time. Some embodiments include more than two receivers, thus providing better accuracy through redundant information, or a larger coverage range.

In operation, a user creates a signature shape 160 on paper 150 using ultrasonic pen 140. Receivers 120 and 130 track the location of the pen versus time, and computer 110 stores the signature shape as part of a signature to be authenticated. In various embodiments of the present invention, additional data are collected and included as part of the signature to be authenticated. For example, in some embodiments, computer 110 also calculates velocity and acceleration of the pen versus time, and includes these data as part of the signature to be authenticated. Also for example, in some embodiments, ultrasonic pen 140 includes a pressure sensitive tip that provides information representing pressure applied to the pen tip versus time, and this pressure data is included as part of the signature to be authenticated. Also for example, the location or identity of computer 110 can be included as part of the signature to be authenticated. The location of computer 110 can be represented by a phone number, and the identity of computer 110 can be represented as an internet protocol (IP) address. A time stamp representing the time of the signature can also be included.

Computer 110 includes a library of signatures to which the collected signature can be compared and possibly authenticated. For example, the signature of a person named "John Doe" can be stored in a signature library within computer 110. John Doe's signature data within the library can include any combination of signature data, including for example, signature shape, pen location versus time, pen velocity versus time, pen acceleration versus time, pressure applied to the pen tip versus time, computer location or identity, and time stamp. Computer 110 compares the signature to be authenticated to data in the signature library to determine if the signature is authentic.

The method and apparatus of the present invention allow a user to write out a signature using a pen that produces ink on paper, thereby providing a comfortable signature experience. Most people are accustomed to using an ink pen when providing a signature, and ultrasonic pen 140, while allowing the collection of data over and above signature shape, provides the "ink pen experience" that is comfortable for most people. Additionally, ultrasonic pen 140 provides signature information using transmitters, and so the pen does not need to be tethered. Again, most people are more comfortable using a non-tethered pen, and in this regard, ultrasonic pen 140 provides a signature experience that is close to a natural ink pen experience.

Providing a signature experience that is close to a natural ink pen experience allows a user to provide a natural signature that is not biased as a result of the tools used. For example, John Doe might provide a biased signature if forced to read his signature on a display that is not co-located with the pen tip. This is referred to as the "write here, look there" problem. Also for example, John Doe might provide a biased signature if forced to write on a surface other than paper. A system that forces John Doe to sign on a spongy pad may bias his signature, as might a system that forces John to sign inside a small box using a tethered pen. The method and apparatus of the present invention do not suffer from these potentially signature-biasing problems, in part because a signature experience is provided that is close to a natural ink pen signature experience.

Figure 2:
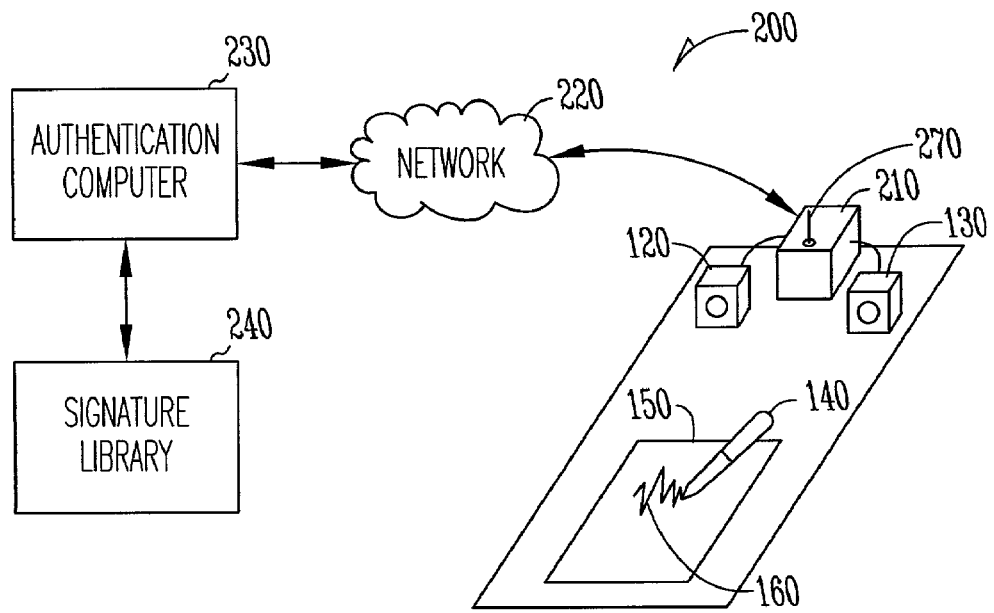
FIG. 2 shows a signature collection system and remote authentication system.

FIG. 2 shows a signature collection system and remote authentication system. System 200 includes ultrasonic pen 140, receivers 120 and 130, network interface 210, network 220, authentication computer 230, and signature library 240. Some components of system 200 are common to both system 200 and system 100 (FIG. 1). For example, ultrasonic pen 140 and receivers 120 and 130 are common to both systems. In system 200, receivers 120 and 130 are coupled to network interface 210, which is coupled to authentication computer 230 through network 220.

In some embodiments, network interface 210 is a dedicated computer operative to collect the data representing the signature to be authenticated. For example, network interface 210 collects the signature shape and the pen location versus time, calculates the velocity and acceleration of the pen, and bundles this with information describing the pressure applied to the pen tip versus time. In addition, network interface 210 can bundle all of this information with a time stamp and a phone number or IP address. Network interface 210 also includes antenna 270 to receive a higher frequency signal from ultrasonic pen 140.

In operation, a user creates signature shape 160 in ink on paper 150 using ultrasonic pen 140. Ultrasonic pen 140 periodically transmits pulses of ultrasonic energy and bursts of higher frequency energy. Antenna 270 receives the higher frequency energy from ultrasonic pen 140. Network interface 210 includes a higher frequency receiver coupled to antenna 270, which provides a time base to network interface 210. Receivers 120 and 130 receive the ultrasonic bursts from ultrasonic pen 140, and provide a time-of-arrival to network interface 210, which then triangulates the position of ultrasonic pen 140.

Antenna 170 is shown affixed to receiver 120 in FIG. 1, and antenna 270 is shown affixed to network interface 210 in FIG. 2. In embodiments represented by FIG. 1, a higher frequency receiver is co-located with ultrasonic receiver 120, and in embodiments represented by FIG. 2, a higher frequency receiver is co-located with network interface 210. These embodiments employ a higher frequency receiver, such as an RF receiver, that benefits from an antenna like the type shown. In other embodiments, different antenna types are employed. For example, when either network interface 210 or ultrasonic receiver 120 include an IR receiver, the antenna may include an IR detector and a lens. In general, any suitable type of antenna or other energy receiving apparatus can be utilized to receive higher frequency energy from ultrasonic pen 140. Furthermore, the higher frequency receiver can be co-located with any other component in the system, and in some embodiments, is a stand-alone receiver.

Network interface 210 bundles the data in the signature to be authenticated into a packet, and sends the packet through network 220 to authentication computer 230. In some embodiments, network interface 210 compresses and encrypts the signature prior to sending it through network 220. Network 220 is any type of network capable of transporting the signature to be authenticated to authentication computer 230. For example, in some embodiments, network 220 is a dedicated network within an enterprise such as a retail sales establishment, and in other embodiments, network 220 is an open network such as the internet.

In some embodiments, network interface 210 includes a wireless interface to communicate with authentication computer 230. In these embodiments, network 220 represents the air medium between network interface 210 and authentication computer 230. In operation, ultrasonic receivers 120 and 130 receive ultrasonic bursts, and a higher frequency receiver (not shown) receives higher frequency bursts, all of which are provided to network interface 210. Network interface 210 then communicates with authentication computer 230 through a wireless interface.

Authentication computer 230 receives, de-crypts and de-compresses the signature to be authenticated, and compares it to signatures within signature library 240. In some embodiments, authentication computer 230 adds the signature to signature library 240 when it cannot be authenticated.

System 200 can be useful in applications where a complete computer is not co-located with paper 150 and ultrasonic pen 140. For example, in point-of-sale (POS) applications, a customer may sign a receipt at a location where it is inconvenient to locate authentication computer 230. In these applications, network interface 210 and receivers 120 and 130 can be located on a surface accessible to a customer, and authentication computer 230 can be under the surface, in a different room, or in a different building altogether.

Figure 3:
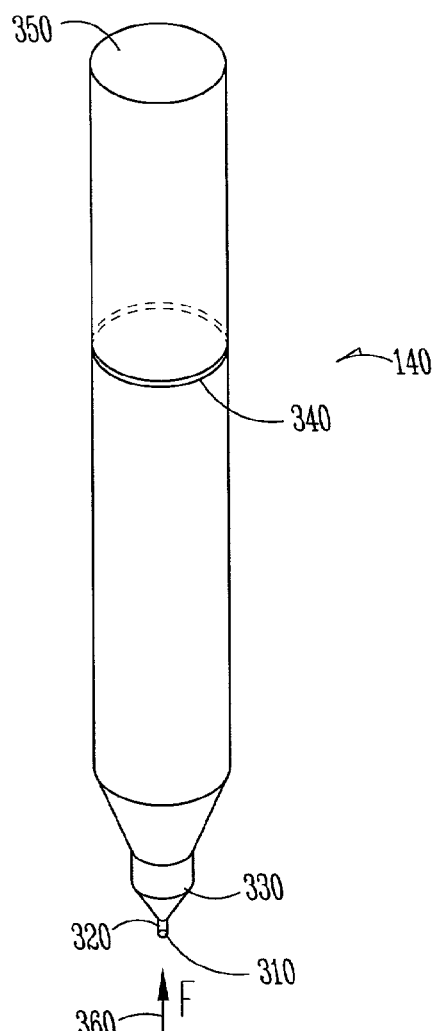
FIG. 3 shows an ultrasonic pen.

FIG. 3 shows an ultrasonic pen. Ultrasonic pen 140 includes tip 310, ultrasonic transmitter 330 near tip 310, ink cartridge 320, and antenna 340. In some embodiments, ultrasonic pen is turned on when pressure, shown as force vector 360, is applied to ultrasonic pen 140. When ultrasonic pen 140 is on, ultrasonic transmitter 330 emits pulses of ultrasonic energy, and antenna 340 emits higher frequency bursts. Ultrasonic transmitter 330 can emit ultrasonic energy at any suitable frequency. In some embodiments, ultrasonic transmitter 330 emits energy at between 40 kHz and 80 kHz. Ultrasonic pen 140 can be in any position relative to the receiving stations when the pen is turned on, and the position of ultrasonic pen 140 can be triangulated by the receiving stations, or by computer 110 (FIG. 1).

Ultrasonic transmitter 330 is positioned near tip 310 which is coupled to a pressure activated switch (not shown). When tip 310 is pressed against a surface such as paper 150 (FIG. 1), ultrasonic transmitter 330 turns on and emits ultrasonic energy. In some embodiments, ultrasonic transmitter 330 is a cylindrical, omni-directional transmitter made of a polymer material. The cylindrical shape allows tip 310 to pass through, and the omni-directional pattern allows the ultrasonic receivers to receive the ultrasonic energy at an acceptable amplitude. In some embodiments, ultrasonic transmitter 330 includes a plurality of piezoelectric panels arranged in a cylindrical pattern. In other embodiments, ultrasonic transmitter 330 includes a single cylindrical piezoelectric transmitter.

Antenna 340 is coupled to a higher frequency transmitter (not shown) within ultrasonic pen 140. Antenna 340 is an omni-directional antenna configured to transmit bursts of higher frequency energy when ultrasonic pen 140 is turned on. In some embodiments, antenna 340 is positioned near the center of ultrasonic pen 140 as shown in FIG. 3, and in other embodiments, antenna 340 is near tip 310. In still other embodiments, antenna 340 is near end 350. Antenna 340 is made of material suitable for the higher frequency at which it operates. For example, in embodiments that include an RF transmitter, antenna 340 can be made of a metallic material suitable for radiating RF energy. In embodiments that include an IR transmitter, antenna 340 can be made of light emitting diodes.

Pen tip 310 dispenses ink from ink cartridge 320 when tip 310 is applied to paper. In addition, pen tip 310 is coupled to a pressure sensitive switch to turn on ultrasonic pen 140 as previously described. In some embodiments, the pressure sensitive switch is also a pressure sensor that senses the amount of pressure applied to pen tip 310. The pressure information that is generated by the pressure sensitive switch is transmitted at the higher frequency by antenna 340. This pressure information is received by the higher frequency receiver (FIG. 1), and included as part of the signature to be authenticated.

Figure 4:
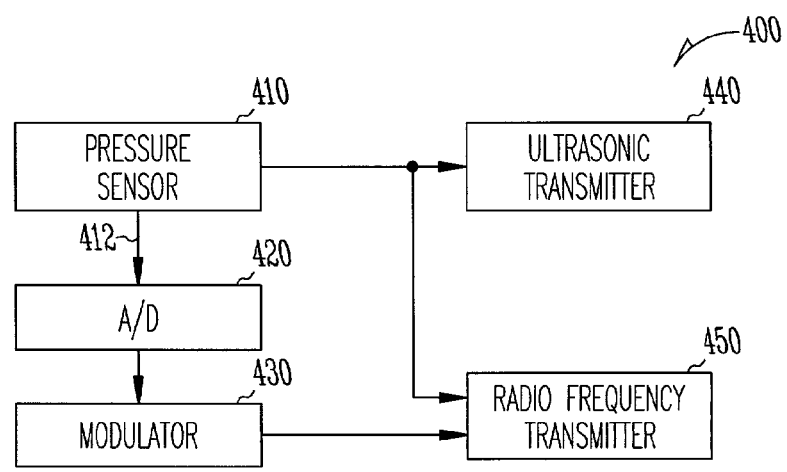
FIG. 4 shows a block diagram of a first ultrasonic pen.

FIG. 4 shows a block diagram of an ultrasonic pen. Ultrasonic pen 400 represents embodiments of ultrasonic pen 140 (FIGS. 1-3) that include a radio frequency (RF) transmitter. Ultrasonic pen 400 includes pressure sensor 410, analog-to-digital converter (A/D) 420, modulator 430, RF transmitter 450, and ultrasonic transmitter 440. Ultrasonic transmitter 440 and RF transmitter 450 are turned on by pressure sensor 410. This occurs when pressure is applied to the tip of ultrasonic pen 400. When turned on, RF transmitter 440 transmits periodic RF bursts from ultrasonic pen 400.

Pressure sensor 410 supplies A/D 420 with a signal that includes information describing the pressure applied to the tip of the pen. For example, a signal having an amplitude that is proportional to pressure can be provided on node 412. A/D 420 digitizes this information and provides it to modulator 430. Modulator 430 receives the digital pressure information from A/D 420 and drives RF transmitter 450. In some embodiments, each RF burst transmitted by RF transmitter 450 includes pressure information.

Modulator 430 can be any type of modulator suitable for modulating pressure information on an RF burst. In some embodiments, modulator 430 is an amplitude modulator, and in other embodiments, modulator 430 is a phase modulator. In still other embodiments, modulator 430 is a modulator that combines amplitude and phase modulation.

The frequency of the RF bursts determines how often pressure information is transmitted by ultrasonic pen 400. For example, in systems that transmit 100 bursts per second, pressure information is also transmitted 100 times per second. In some embodiments, the sampling rate of pressure information is equal to the burst frequency of the transmitter, and in other embodiments, the sampling rate of pressure information is greater than the burst frequency of the transmitter. In embodiments that have unequal sampling rates and burst frequencies, each burst includes more than one discrete pressure data point. For example, if the burst frequency is 100 times per second, and the pressure sampling rate is 200 samples per second, each RF burst can include two pressure data points.

RF transmitter 450 is an example of a higher frequency transmitter suitable for use as a time reference between the pen and the receiving station. Other types of higher frequency transmitters can be used without departing from the scope of the present invention. For example, in other embodiments, an infrared (IR) transmitter is used.

Figure 5:
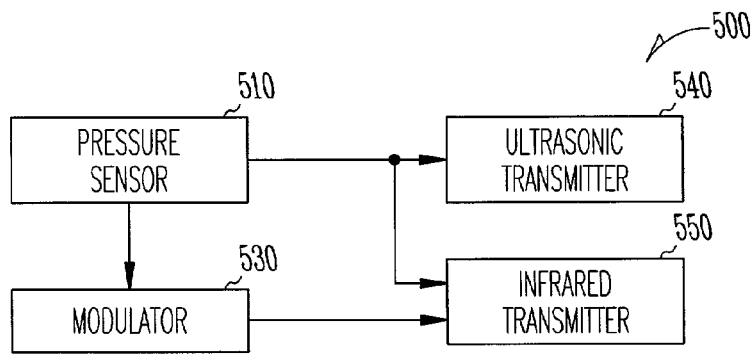
FIG. 5 shows a block diagram of a second ultrasonic pen.

FIG. 5 shows a block diagram of an ultrasonic pen with an IR transmitter. Ultrasonic pen 500, like ultrasonic pen 400 (FIG. 4), represents various embodiments of ultrasonic pen 140 (FIGS. 1-3). Unlike ultrasonic pen 400, ultrasonic pen 500 includes infrared transmitter 550. Ultrasonic pen 500 also includes pressure sensor 510, modulator 530, and ultrasonic transmitter 540.

In operation, pressure sensor 510 turns on ultrasonic transmitter 540 and IR transmitter 550 when pressure is applied to the tip of the pen. Ultrasonic transmitter 540 transmits ultrasonic pulses so that the position of ultrasonic pen 500 can be triangulated. IR transmitter 550 transmits infrared bursts that include pressure information provided by modulator 530. Modulator 530 is an analog modulator that modulates using a variable voltage rather than a digital signal.

Ultrasonic pen 500 is shown with an IR transmitter and without an A/D converter. Ultrasonic pen 400 (FIG. 4), on the other hand, is shown with an RF transmitter and also with an A/D. Some embodiments include an RF transmitter without an A/D, and other embodiments include an IR transmitter with an A/D. One skilled in the art will understand that the various features shown can be combined in different combinations to arrive at different embodiments of the present invention.

Figure 6:
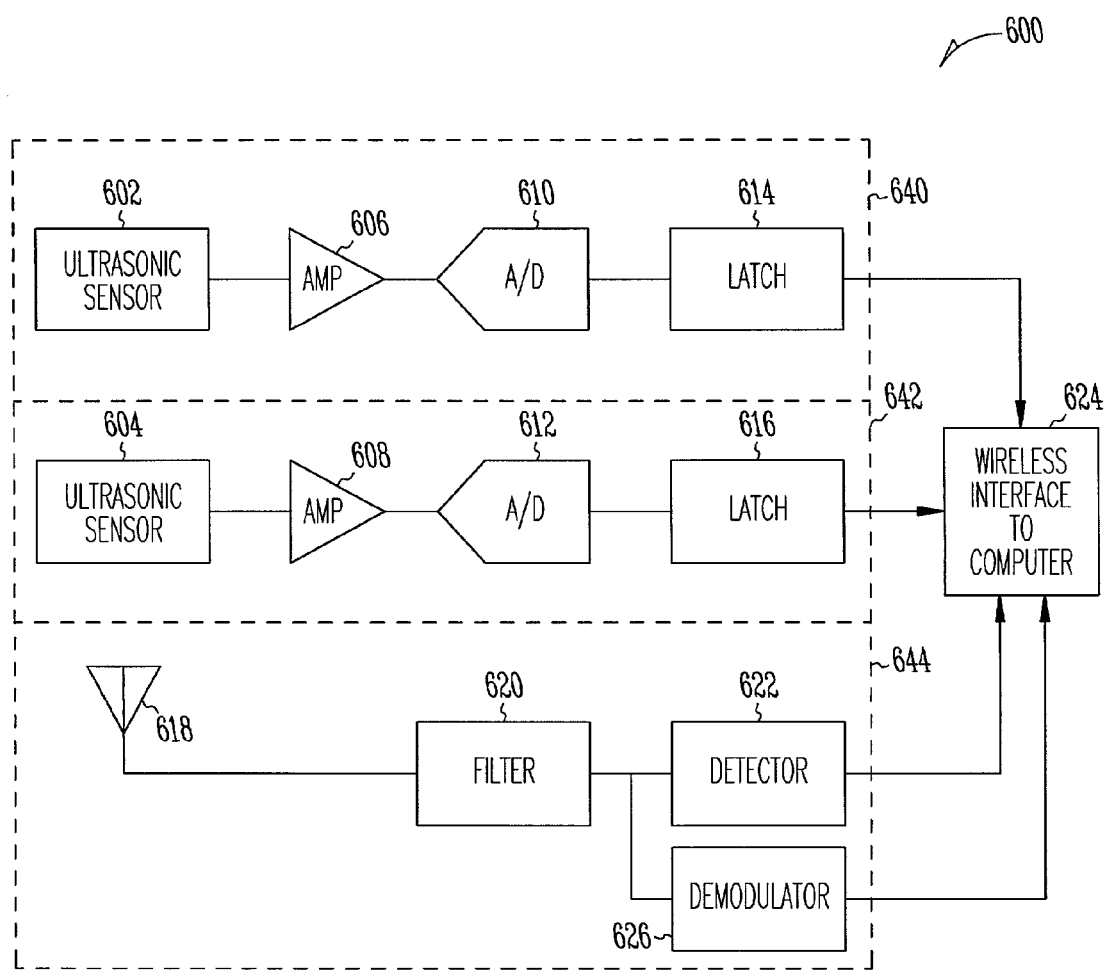
FIG. 6 shows a block diagram of receivers for use in conjunction with a signature collection system.

FIG. 6 shows a block diagram of receivers for use in conjunction with a signature collection system. Receiver 600 include ultrasonic receivers 640, 642, and RF receiver 644, corresponding to the ultrasonic receivers and higher frequency receiver described with reference to FIGS. 1 and 2. Ultrasonic receiver 640 includes ultrasonic sensor 602, amplifier 606, analog-to-digital converter (A/D) 610, and latch 614. Ultrasonic receiver 642 includes ultrasonic sensor 604, amplifier 608, A/D 612, and latch 616. RF receiver 644 includes antenna 618, filter 620, demodulator 626, and detector 622. Each of receivers 640, 642, and 644 provides information to wireless interface 624.

RF receiver 644 receives radio frequency bursts at antenna 618, detects the time-of-arrival of the bursts at detector 622, and provides the time-of-arrival to wireless interface 624. In addition, demodulator 626 demodulates data present in the bursts, and provides the data to wireless interface 624. In some embodiments, the demodulated data represents pressure applied to a pen tip. In some embodiments, digital information is demodulated by demodulator 626. In these embodiments, any number of symbols can be demodulated per RF burst, and any number of bits can be included in each symbol. In other embodiments, analog information is demodulated by demodulator 626. In some of these embodiments, wireless interface 624 includes an analog-to-digital converter to digitize the demodulated data.

Antenna 618 corresponds to antennas 170 (FIG. 1) and 270 (FIG. 2). Accordingly, RF receiver 644 can be co-located with either of ultrasonic receivers 640 and 642, or can be co-located with wireless interface 424. Embodiments represented by FIG. 6 include an RF receiver as a higher frequency receiver. Other embodiments include other types of higher frequency receivers. For example, some embodiments include an IR receiver rather than an RF receiver.

Ultrasonic receivers 640 and 642 receive ultrasonic pulses, and provide the time-of-arrival of the ultrasonic pulses to wireless interface 624. Wireless interface 624 provides the time-of-arrival information and the demodulated data to an authentication computer such as computer 110 (FIG. 1) or computer 230 (FIG. 2). In some embodiments, wireless interface 624 includes a processor that determines the difference between the times-of-arrival of RF bursts and ultrasonic pulses, and provides the difference to the computer. In some embodiments, wireless interface 624 uses an industry standard interface such as the "Bluetooth" standard. In other embodiments, wireless interface 624 uses a dedicated interface between the authentication computer and wireless interface 624.

Figure 7:
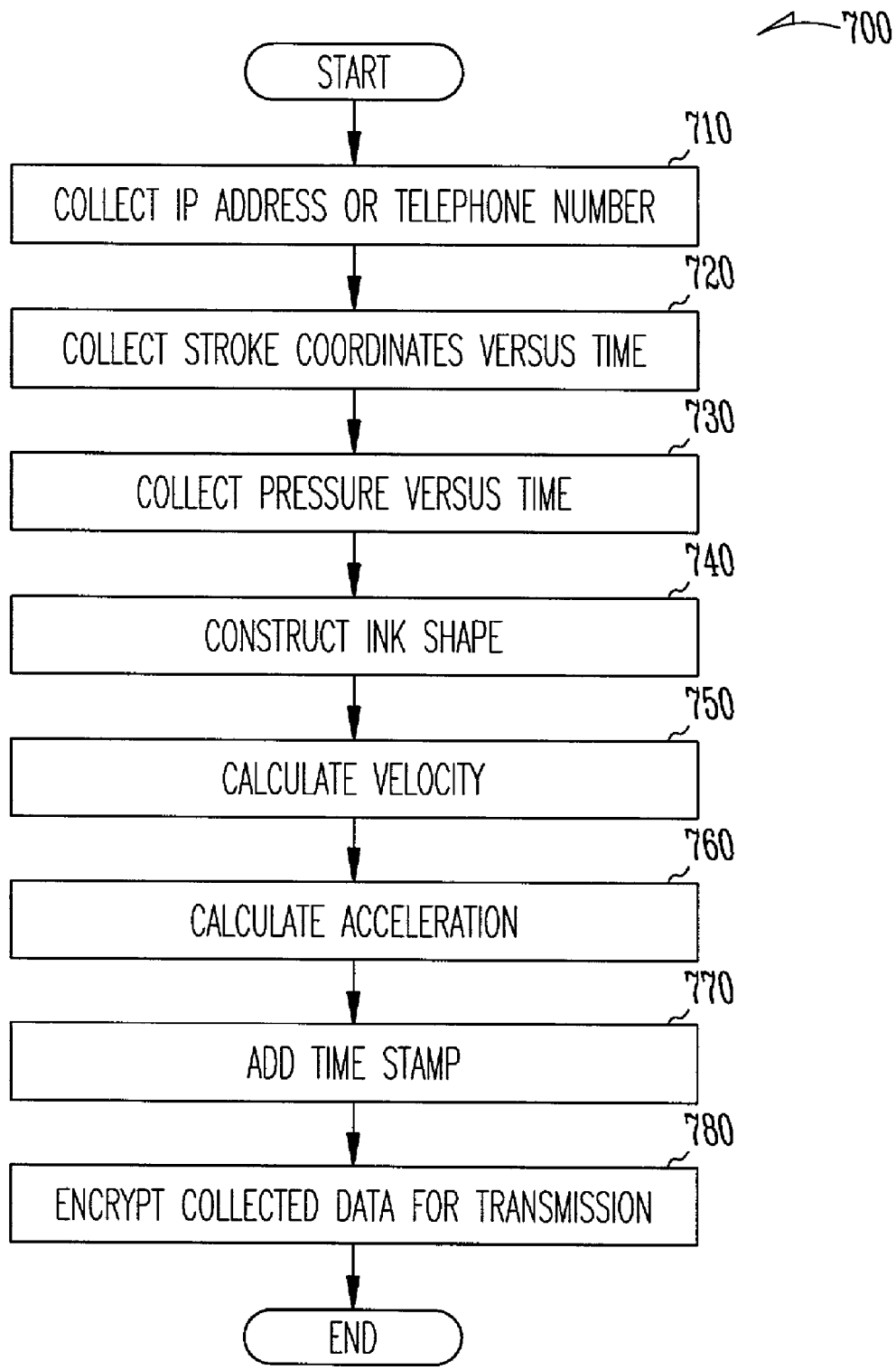
FIG. 7 shows a flowchart of a method for collecting signatures to be authenticated.

FIG. 7 shows a flowchart of a method for collecting signatures to be authenticated. Method 700 begins at block 710 where an internet protocol (IP) address or a telephone number is collected. The IP address or telephone number represents an identity of the location from which the signature is retrieved. For example, referring now back to FIG. 2, network interface 210 may have an IP address when network 220 is the internet, or network interface 210 may have a phone number associated therewith when network 220 is a telephone network. The IP address or telephone number can be used by an authentication computer to verify the location from which the signature is retrieved. In some embodiments, a signature is authentic only if it is retrieved from a particular location, and in other embodiments, a signature is authentic only if it is retrieved from one of a list of locations. In still other embodiments, the location information is not utilized for authentication, but rather is used to document the location for archival purposes.

Block 720 involves the collection of signature stroke coordinates of a pen versus time. This includes receiving from the pen higher frequency bursts at a higher frequency receiver, and receiving from the pen ultrasonic pulses at more than one ultrasonic receiver. In some embodiments, the higher frequency bursts travel from the pen to the receiver at approximately the speed of light, and the ultrasonic pulses travel from the pen to the receiver at approximately the speed of sound. These two speeds differ by many orders of magnitude, so the higher frequency bursts can be used as a time reference to calculate the time-of-arrival of the ultrasonic pulses at the more than one receiver. The times-of-arrival are then used to triangulate the position of the pen relative to the receivers. This represents the signature stoke coordinates versus time.

In block 730, pressure information versus time is collected. As previously described, in some embodiments, the higher frequency bursts include information describing the amount of pressure applied to the pen tip. This information is demodulated and digitized to generate the pressure applied to the pen versus time.

In block 740, the stroke coordinates versus time (from block 720) are used to construct the ink shape made by the pen. In blocks 750 and 760, the velocity of the pen and the acceleration of the pen are calculated using the stroke coordinates versus time.

In block 770, a time stamp is added. The time stamp represents the time that the signature was made. Like the location information described above, the time stamp is used for authentication in some embodiments, and in other embodiments, the time stamp is used to document the time of the signature for archival purposes.

The signature information collected in method 700 is bundled as part of a signature to be authenticated. In some embodiments, the signature is authenticated by a computer that is remote relative to the apparatus that performs the collection. In these embodiments, the signature is prepared for authentication in various ways. In block 780, the signature is prepared by encrypting the collected data. In some embodiments, the encrypted signature data is packetized into a packet and sent across a network to an authentication computer. This is useful in embodiments that use a public network for network 220 (FIG. 2). For example, when the signature is to be transmitted over the internet, block 780 can provide encryption services to reduce the chance that an unwanted recipient will gain access to the signature data.

Method 700 can be performed by a general purpose computer such as computer 110 (FIG. 1), or by a specialized computer designed specifically for signature collection, such as network interface 210 (FIG. 2). The computer instructions useful to perform the method can be stored on any type of suitable media, including random access memory (RAM), read-only memory (ROM), CDROM, or floppy or hard disks. For example, computer 110 (FIG. 1) includes disk drive 180. Disk drive 180 is one example of an article having a machine readable medium suitable to store computer instructions for method 700.

While the blocks within method 700 are presented in FIG. 7 in a specific order, this is not meant to imply that the actions need be performed in the order shown. For example, collecting an IP address or telephone number can be performed at any point within method 700. Similarly, any block shown can be performed in an order different from that presented in the figure without departing from the scope of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An ultrasonic pen comprising:
   a pressure sensitive tip to generate a pressure signal;
   an ultrasonic transmitter to transmit pulses for position determination;
   a pressure activated switch coupled to the pressure sensitive tip, wherein the pressure activated switch is operable to turn on the ultrasonic transmitter when pressure is applied to the pressure sensitive tip; and
   a second transmitter to transmit the pressure signal.

2. The ultrasonic pen of claim 1 wherein the pressure sensitive tip includes an ink dispenser.

3. The ultrasonic pen of claim 1 wherein the ultrasonic transmitter and the second transmitter emit energy at different frequencies.

4. The ultrasonic pen of claim 3 wherein the ultrasonic transmitter emits ultrasonic energy between substantially forty kilohertz and eighty kilohertz.

5. The ultrasonic pen of claim 1 wherein the ultrasonic transmitter comprises a piezoelectric material.

6. The ultrasonic pen of claim 5 wherein the piezoelectric material is arranged in a cylinder.

7. The ultrasonic pen of claim 1 wherein the second transmitter comprises an infrared transmitter.

8. The ultrasonic pen of claim 7 wherein the second transmitter is configured to provide a time reference signal.

9. The ultrasonic pen of claim 1 wherein the second transmitter comprises a radio frequency transmitter.

10. The ultrasonic pen of claim 1 wherein the ultrasonic transmitter and the second transmitter are burst transmitters.

11. A digital signature collection system comprising:
    a first ultrasonic receiver;
    a second ultrasonic receiver mountable on a surface a distance from the first ultrasonic receiver;
    a higher frequency receiver; and
    an ultrasonic pen having a pressure sensitive tip to generate a pressure sianal, the pressure sensitive tip coupled to a pressure activated switch, wherein the pressure activated switch is operable to turn on an ultrasonic transmitter when pressure is applied to the pressure sensitive tip, the ultrasonic pen also including an ink cartridge to dispense ink, the ultrasonic pen being configured to transmit the pressure signal to the higher frequency receiver, and to transmit ultrasonic energy to the first and second ultrasonic receivers.

12. The digital signature collection system of claim 11 further comprising a computer coupled to the first and second ultrasonic receivers and the higher frequency receiver.

13. The digital signature collection system of claim 12 wherein the computer is configured to receive time-of-arrival data from the first and second ultrasonic receivers, and configured to receive pressure signal information from the higher frequency receiver.

14. The digital signature collection system of claim 13 wherein the computer is further configured to determine a location of the ultrasonic pen versus time, a velocity of the ultrasonic pen versus time, and an acceleration of the ultrasonic pen versus time.

15. The digital signature collection system of claim 11 wherein the higher frequency receiver comprises an infrared receiver.

16. The digital signature collection system of claim 11 wherein the higher frequency receiver comprises a radio frequency receiver.

* * * * *